United States Patent [19]
Coles, Jr. et al.

[11] 3,709,032
[45] Jan. 9, 1973

[54] TEMPERATURE PULSED INJECTIVITY PROFILING

[75] Inventors: Roy D. Coles, Jr.; Johannes H. M. Thomeer, both of Houston; Curtis A. Chase, Jr., Pearland, all of Tex.

[73] Assignee: Shell Oil Company, New York, N.Y.

[22] Filed: Dec. 28, 1970

[21] Appl. No.: 101,728

[52] U.S. Cl. ................................................. 73/154
[51] Int. Cl. ........................................... E21b 47/10
[58] Field of Search ................ 73/154, 152; 166/260

[56] References Cited

UNITED STATES PATENTS 2,739,475  3/1956  Nowak .................................... 73/152
2,242,612  5/1941  Leonardon ............................ 73/154
3,480,079  11/1969  Gainn et al. ....................... 73/154 X
2,172,625  9/1939  Schlumberger .................... 73/152 X Primary Examiner—Jerry W. Myracle
Attorney—H. W. Coryell and Harold L. Denkler

[57] ABSTRACT

A well logging process for measuring temperature to determine the injectivity profile of a reservoir interval is improved by injecting a temperature pulsing fluid of known amount and distinctive temperature within a short time, measuring a rate with depth of the temperature recovery within the well, and determining the corresponding rate with depth of the inflow of fluid into the reservoir interval.

5 Claims, 2 Drawing Figures

TEMPERATURE PULSED INJECTIVITY PROFILING

BACKGROUND OF THE INVENTION

This invention relates to a well temperature logging process for determining the injectivity profile of a reservoir interval into which a well has been completed. The injectivity profile of a reservoir interval is a measure of the rates at which an injected fluid will flow into the individual layers within the interval, i.e., the rate with depth of the inflow of fluid into the reservoir rocks.

Various well temperature logging processes have been previously proposed for obtaining various types of information. U.S. Pat. No. 2,739,475 describes such a process for determining the injectivity profile of a reservoir interval. In the patented process, fluid having a temperature different from that of the reservoir interval is injected until a steady state of fluid inflow is attained. The temperature with depth within the well is measured both during and after the attainment of the steady state inflow of fluid. The depths of the layers into which the fluid flows are determined from the variations in temperature with depth during the steady state injection. The rates at which fluid flows into individual layers of the reservoir intervals are calculated from the differences between the temperature at each depth after the steady state fluid injection and the extrapolated natural temperature at that depth. The necessity of establishing a steady state of fluid injection and either measuring or estimating the specific geothermal temperatures is a disadvantage. It is difficult to make such measurements or estimates with a significant degree of accuracy at a reasonable cost. Moreover, after a long injection time, e.g., throughout a period exceeding about a week, such a calculation of injection rates may become very inaccurate.

SUMMARY OF THE INVENTION

In accordance with the present invention, quantities related to the injectivity profile of a reservoir interval into which a well is completed are measured by injecting a discrete slug of a temperature pulsing fluid and logging the rate of temperature recovery after the injection is stopped. A temperature pulsing fluid of known and substantially inert composition is injected into the reservoir interval: in a known amount, at a known temperature different from the temperature of the reservoir interval, and within a known relatively short time. The temperatures at different depths within the well are measured at times at which they are recovering from the change caused by the injection of the temperature pulsing fluid and measurements are made of the rate with depth of the change of temperature. The results of the measurements are utilized to determine a rate with depth of fluid inflow that corresponds to the distribution of the temperatures (in the well and in the reservoir) that are due to the inflow of the known amount of temperature pulsing fluid of known heat content.

The temperature pulsing fluid can be either hotter or colder than the reservoir interval. It is important that information be obtained on the amount of fluid that was injected within a known and relatively short time, e.g., from about 1 to 24 hours (preferably from about 2 to 12 hours). If variations occur in the temperature of the fluid, it is important that information be obtained on the magnitude with time of the variations.

DESCRIPTION OF THE INVENTION

Figure 1:
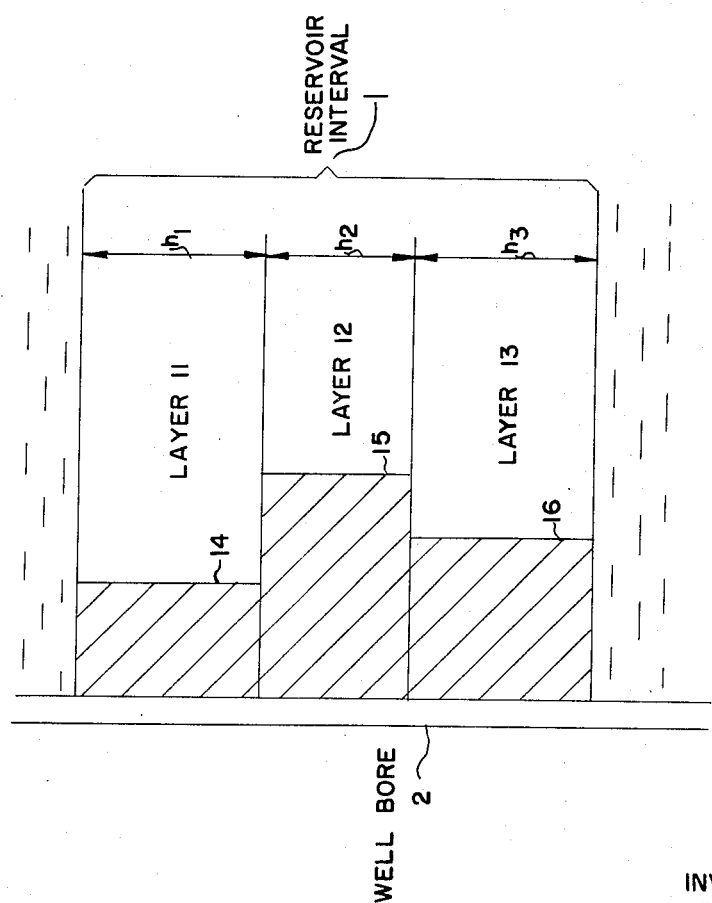
FIG. 1 illustrates a vertical section of a reservoir interval being investigated in accordance with this invention.

FIG. 1 shows a reservoir interval 1 in fluid communication with the borehole 2 of a well. The interval contains earth formation layers 11, 12 and 13 having thicknesses $h_1$, $h_2$, and $h_3$. The shaded portions 14, 15 and 16 of the layers represent the relative extents to which each is penetrated by a fluid that was injected into the reservoir interval within a relatively short injection time $t_i$.

Figure 2:
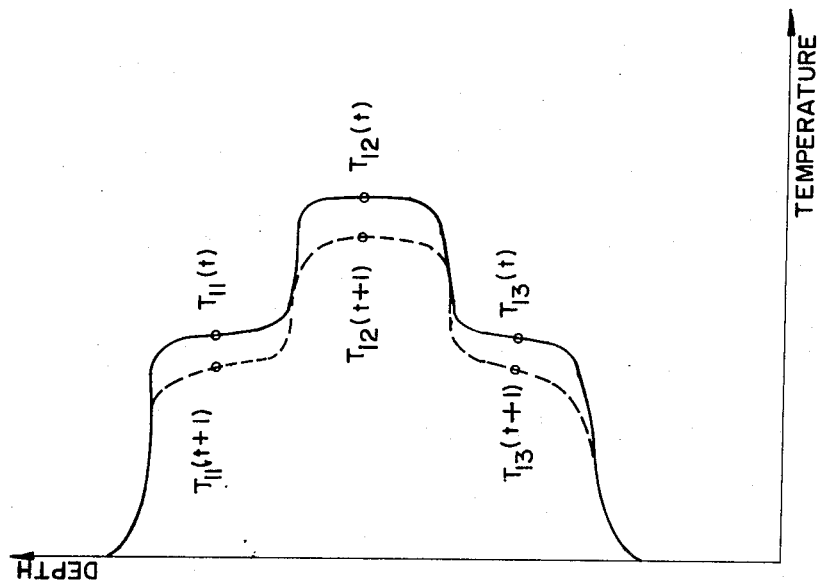
FIG. 2 illustrates logs of temperatures within the reservoir interval of FIG. 1.

FIG. 2 represents the temperature with depth in borehole 2 at a shut-in time $t$ and a shut-in time $t + 1$ after the injection into the reservoir interval of a temperature pulsing fluid hotter than the reservoir. At each depth within the reservoir interval measurements are made relative to the rate at which the temperature is recovering from the change caused by the injection of the hot fluid. The rate per unit difference between injected fluid temperature and initial layer temperature is compared with the shut-in time $t$ divided by the total time $t_i + t$. The wellbore temperature at a given formation layer is expressed by the equation:

$$\frac{T(t) - T_o}{T_i - T_o} = 1 - \left(\frac{t}{t_i + t}\right) v \qquad (1)$$

where $T_o$ = original formation temperature before injection of fluid, (temperature)

$T_i$ = temperature of fluid injected into the formation, (temperature)

$T(t)$ = observed wellbore temperature (a function of time t), (temperature)

$t_i$ = length of injection cycle, (time)

$t$ = time measured from instant injection of fluid is stopped, (time)

$v = mC_{pf}/4\pi K_{eff}$, (dimensionless)

$m$ = mass injection rate of fluid per unit of formation thickness, (mass)/(length) (time), $C_{pf}$ = heat capacity of fluid phase, (energy)/(mass) (°temperature), $K_{eff}$ = effective thermal conductivity of combined rock and fluid phase, (energy)/(length) (time) (°temperature), The assumptions under which Equation (1) is directly applicable are:

1. The layer into which fluid is injected is thick enough so that for practical purposes heat losses are only in the radial direction (i.e., losses to adjacent zones and to cap rock are neglected). During shut-in, no cross flow of fluid occurs.

2. Wellbore effects due to conduction losses up and down the casing and due to connection of wellbore fluid are not significant.

3. Friction heating effects of casing perforations, damaged zone around the wellbore, and formation permeability are negligible.

4. Before injection is begun, a stable temperature distribution exists around the centerline of the formational layers. This means no appreciable injection (or production) before $t_i$ begins, long times since last production (or injection), or long-term, constant temperature injection. Temperature of the injected fluid is $T_i$, or the average temperature of injected fluid can be represented by $T_i$.

When a measured quantity of fluid is injected into the reservoir interval, the fluid distributes itself in different amounts in various layers. As a result of the distribution of an injected hot fluid, the temperature profile might appear as shown in FIG. 2. Equation (1) can be arranged as follows in order to estimate this distribution.

$$\ln \frac{T_i - T(t)}{T_i - T_o} = v \ln \left(\frac{t}{t_i + t}\right) \qquad (2)$$

For example, the equation can be used by plotting on log-log paper the observed $[T_i - T(t)]/(T_i - T_o)$ against $(t)/(t_i + t)$ for each layer in the formation. The slope for each curve is the value of $v$ for that layer. The mass injection rate per unit of layer thickness is then easily calculated from $$m = 4\pi K_{eff} v / C_{pf}$$

In general, the equipment and techniques used in practicing this invention may comprise items that are presently known and available. Suitable items of equipment and techniques are described in U.S. Pat. No. 2,739,475.

In injecting the temperature pulsing fluid, it may be desirable to monitor and/or control the temperature of the fluid being injected by disposing a temperature sensing device and/or temperature controlling device within the well borehole near the reservoir interval. In measuring the rate with depth of the temperature recovery within the borehole after the injection of the temperature pulsing fluid, it may be desirable to minimize convection currents, for example, by spotting a relatively viscous fluid or gel within the well borehole across (i.e., adjacent to) the reservoir interval.

With respect to the injection of the pulsing fluid, the decrease in pressure of a flowing fluid due to viscous resistance represents a degradation of potential energy to heat. Unless this heat is removed by some means of cooling, the temperature of the flowing fluid will rise. In many cases where a fluid is flowing through a conduit, the temperature rise due to friction heating is so small as to be negligible. However, due to the high resistance to flow of the porous media encountered in petroleum reservoirs, temperature rises of a few degrees occur in reservoirs where the mobility (permeability to viscosity ratio) is less than about 100 md/cp. This temperature rise due to friction heating can be 3° or 4°F at injection rates of 10 to 20 B/D/ft into 10 md rock for injection times exceeding about a day. Smaller temperature rises result from lower injection rates, shorter total fluid injection times, and/or when the reservoir permeability is higher. For instance, the temperature rise at water injection rate of 10 B/D/ft into 100 md rock for 12 hours would be on the order of 0.1°F. A temperature rise of 3° or 4°F is significant with respect to the temperature profiles when fluids are used only 20° or 30° different from the original formation temperature.

At early shut-in times this temperature effect can influence the above described graphical procedure of estimating injection rates. The inclusion of friction heating into the mathematical model introduces the permeability of the layer as an additional parameter. The mathematical model now contains two parameters, permeability and injection rate into the layer. Estimates of these two parameters can be obtained by matching the theoretical curve predicted by the model with the observed transient temperature response of a layer after a short-term injection of a hot or cold fluid. Further, if the injection and formation pressures are known or can be calculated, a permeability can be obtained from the injection rate to compare with the permeability value from the friction heating portion of the shut-in curve. For a 12-hour injection period, observations of transient temperature response up to 100 hours after shut-in appears to give sufficient information to allow estimation of injection rate and mobility.

Estimates of the effects of heat losses to cap and base rock indicate that for observations up to 112 hours after start of injection (12 hours of injection, 100 hours shut-in) the error in the calculated temperature response resulting from neglecting these heat losses is less than 5 percent providing the layer is greater than 13 feet thick.

In general, temperature profiles resulting from hot fluid injection, e.g., using hot water, are more sensitive to the injection rate than those resulting from injection of water colder than the original formation temperature. This is because the temperature effects of friction heating and the effects of hot water are additive. The temperature effect of cold water is partly cancelled by the temperature rise from friction heating.

The above described mathematical model can give reasonably good estimates of the dimensionless injection parameter $v$ for thick layers, an estimate of the mobility of the layers can also be obtained for fairly "tight" layers. The accuracy is improved by an arrangement such that heat conduction up and down the wellbore casing and heat transfer by fluid convection do not smear out the wellbore temperature profiles in the vertical direction to the extent that the centerline layer temperatures are affected.

As an example, Table 1 shows the shut-in temperature data resulting from a 2-hour injection of 200°F water into a 100°F reservoir interval that contains a pair of adjacent layers which have permeabilities higher than 100 md and are thicker than 10 feet. From any one of the tabulated shut-in temperature points, after about 5 hours shut in, fluid injection rates of 10 BDW/ft for one layer and 5 BDW/ft for the other layer can be calculated.

Table 1

SHUT-IN TIMES AND TEMPERATURES $T_i = 200°F$, $T_o = 100°F$, $C_{pf} = 1$ BTU/lb °F (Water), $K_{eff} = 2.2$ BTU/ft hr °F, $t_i = 2$ hrs

| Shut-In Time $t$(hrs) | Well Temp. (°F) | Temp. decrease (°F) | Calculated Mass Injection Rate lbs/hr ft | BDW/ft |
|---|---|---|---|---|
| one layer | | | | |
| 0 | 200 | 0 | | |
| 5 | 183 | 17 | | |
| 10 | 162 | 38 | | |

| | | | | |
|---|---|---|---|---|
| 24 | 135 | 65 | | |
| 48 | 120 | 80 | M = 146 | |
| 96 | 110 | 90 | | |
| 192 | 105 | 95 | | |
| other layer | | | | |
| 0 | 200 | 0 | | |
| 5 | 159 | 41 | | |
| 10 | 139 | 61 | | |
| 24 | 118 | 82 | M = 73 | |
| 48 | 110 | 90 | | |
| 96 | 105 | 95 | | |
| 192 | 102 | 98 | | |

The following exemplifies a preferred procedure for the operation and application of the present process. Other procedures to achieve the same objectives can be substituted if desired or necessary.

1. In this example, 200°F water is injected into a 100°F reservoir for 2 hours to generate the temperature pulse.

2. A number of surface-reading temperature sensing devices are hung in the wellbore across the interval of the formation into which the water is injected. The multi-device arrangement could be replaced by traverses of the borehole at various times by a single temperature-sensing device available from commercial service companies.

3. After the temperature of the formation has been determined to be stable, the injection of 200°F water is begun. The formation temperature need only be "stable" in the sense that its rate of change is known and is relatively slow and constant, so that adjustments can be made for the change during the measuring interval.

4. After two hours of injection, during which the temperature of injected water is recorded, a substantially inert gel is displaced into the borehole.

5. Injection is stopped when the gel is spotted across formation face.

6. Shut-in temperatures at the centerlines of layers in the wellbore are recorded.

7. The logarithm of $(200°F - T(t))/(200°F - 100°F)$ is plotted versus the logarithm of $t/(2 \text{ hrs} + t)$, and the dimensionless injection parameter $v$ is determined for each layer from the slope of each line and is used to calculate the injection rate for each layer.

8. If the foregoing plots do not produce straight lines on log-log scales, then friction heating effects may be important and should be considered. A mathematical model accounting for friction heating is matched with the observed temperature response by varying the values of the model parameters permeability and injection rate into the layer. Values of these two parameters which cause the model to fit the actual data to an acceptable degree are then the actual values.

What is claimed is:

1. A process for measuring quantities related to the rate at which an injected fluid will enter the individual layers of a reservoir interval into which a well has been completed, comprising:

injecting a temperature pulsing fluid into the reservoir interval in a known amount, at a known temperature different from the temperature of the reservoir interval, and within a known relatively short time period;

measuring the rate with depth of the change of temperature within the well while the temperature within the well is recovering from the change caused by the injection of the temperature pulsing fluid; and determining, from said measured rate with depth of temperature change, a rate with depth of fluid inflow that corresponds to the distribution of heat due to the inflow of said temperature pulsing fluid by utilizing the measured information in a mathematical relationship substantially equivalent to:

$$\frac{T(t) - T_o}{T_1 - T_o} = 1 - \left(\frac{t}{t_1 + t}\right)^v$$

where $T_o$ = original formation temperature before injection of fluid, $T_1$ = temperature of fluid injected into the formation, $T(t)$ = observed wellbore temperature, $t_1$ = length of injection cycle, $t$ = time measured from instant injection of fluid is stopped, $v = mC_{pf}/4\pi K_{eff}$ $m$ = mass injection rate of fluid per unit of formation thickness, $C_{pf}$ = heat capacity of fluid phase, $K_{eff}$ = effective thermal conductivity of combined rock and fluid phase.

2. The process of claim 1 in which the well is treated to reduce the effects of convection currents.

3. The process of claim 2 in which a relatively high viscosity fluid is displaced into the portion of the well adjacent to the reservoir interval.

4. The process of claim 1 in which a series of temperature measuring devices are disposed at a series of depths near the reservoir interval and are kept stationary during the measuring of the rate with depth of the change of temperature within the well.

5. The process of claim 1 in which said rate with depth of the changes of temperature is measured by measuring the shut-in temperature near the centerline of each of a plurality of layers at each of a plurality of times after the injection of the temperature pulsing fluid.

* * * * *